US010356327B2

(12) United States Patent
Ueguri

(10) Patent No.: US 10,356,327 B2
(45) Date of Patent: Jul. 16, 2019

(54) DISPLAY CONTROL APPARATUS, METHOD FOR CONTROLLING SAME, AND STORAGE MEDIUM

(71) Applicant: CANON KABUSHIKI KAISHA, Tokyo (JP)

(72) Inventor: Toshiaki Ueguri, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/891,132

(22) Filed: Feb. 7, 2018

(65) Prior Publication Data

US 2018/0234632 A1 Aug. 16, 2018

(30) Foreign Application Priority Data

Feb. 14, 2017 (JP) ................ 2017-025272

(51) Int. Cl.
| | | |
|---|---|---|
| H04N 5/232 | (2006.01) | |
| G06F 3/0488 | (2013.01) | |
| G06F 3/041 | (2006.01) | |
| G03B 13/24 | (2006.01) | |
| G03B 17/02 | (2006.01) | |
| H04N 1/21 | (2006.01) | |

(Continued)

(52) U.S. Cl.
CPC ......... *H04N 5/23293* (2013.01); *G03B 13/24* (2013.01); *G03B 17/02* (2013.01); *G06F 3/0416* (2013.01); *G06F 3/0488* (2013.01); *H04N 1/21* (2013.01); *H04N 5/23216* (2013.01); *H04N 5/772* (2013.01); *G03B 17/14* (2013.01)

(58) Field of Classification Search
CPC ........ G03B 13/24; G03B 17/21; G03B 17/14; G06F 3/0416; G06F 3/0488; H04N 5/23216; H04N 5/23293; H04N 1/21; H04N 5/772
See application file for complete search history.

(56) References Cited

U.S. PATENT DOCUMENTS

2010/0123734 A1* 5/2010 Ozawa .................. G06F 3/0488
345/619
2014/0351698 A1* 11/2014 Nakagawa ............ G06F 3/0485
715/702

(Continued)

FOREIGN PATENT DOCUMENTS

JP 2006-211390 A 8/2006
JP 2015-172836 A 10/2015

*Primary Examiner* — Dmitry Bolotin
(74) *Attorney, Agent, or Firm* — Canon USA, Inc., IP Division

(57) ABSTRACT

A display control apparatus includes a touch detection unit that detects a touch operation on a touch panel, a unit setting unit that sets a unit of unit-by-unit image switching, and a switching unit that switches images so that if the unit is a first unit, an image the first unit ahead is displayed based on a predetermined touch-move of moving a touch position for a first distance, and if the unit is a second unit greater than the first unit, an image the second unit ahead is displayed based on the predetermined touch-move for a second distance longer than the first distance. The second distance is shorter than a distance of the predetermined touch-move required to display an image the second unit ahead of a first image when the unit set by the unit setting unit is the first unit.

18 Claims, 10 Drawing Sheets

(51) Int. Cl.
*H04N 5/77* (2006.01)
*G03B 17/14* (2006.01)

(56) References Cited

U.S. PATENT DOCUMENTS

| | | | |
|---|---|---|---|
| 2016/0119499 A1* | 4/2016 | Uno | H04N 5/23212 348/231.99 |
| 2016/0266703 A1* | 9/2016 | Sugimoto | G06F 3/0485 |
| 2017/0099431 A1* | 4/2017 | Harada | G11B 27/00 |

* cited by examiner

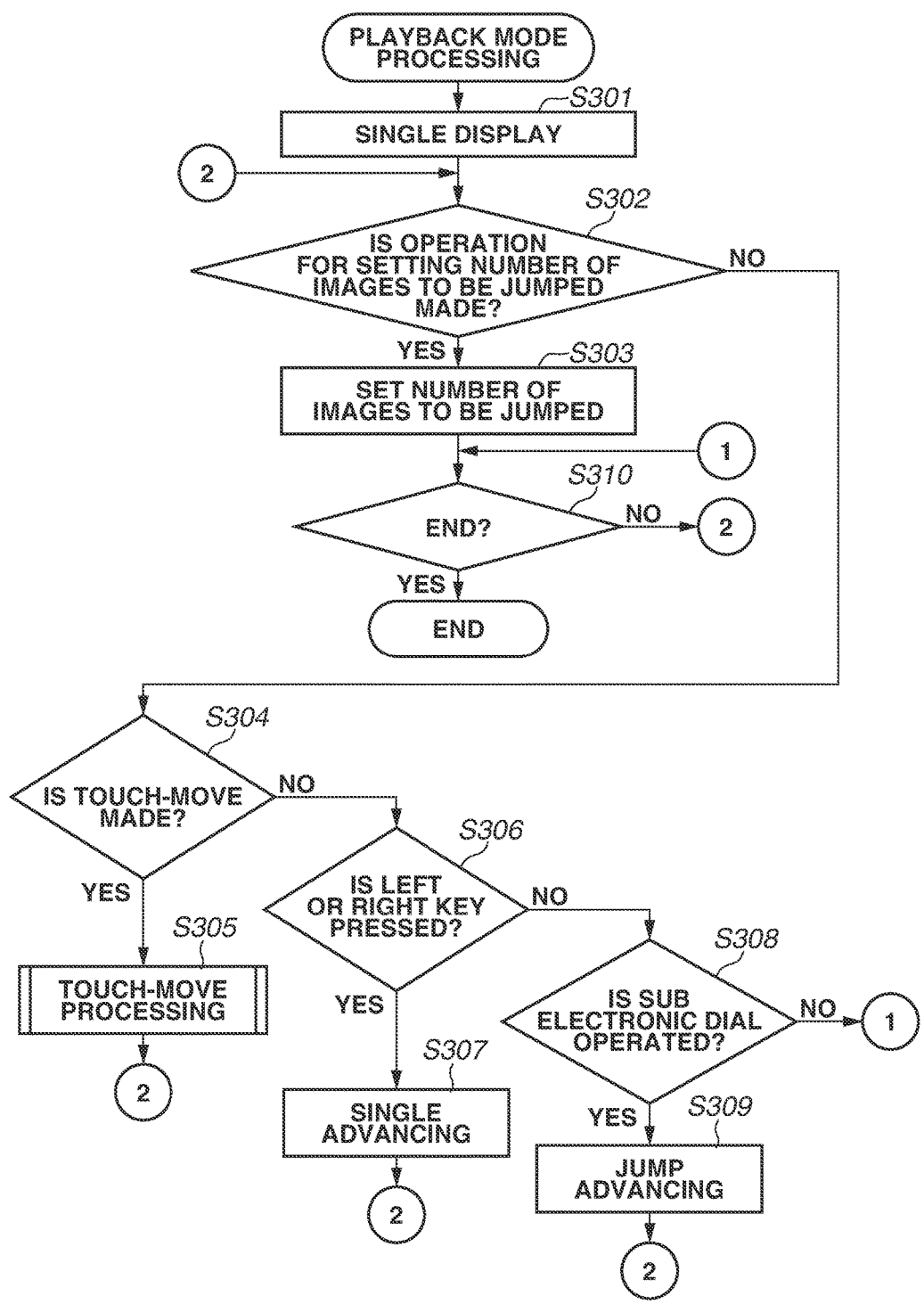

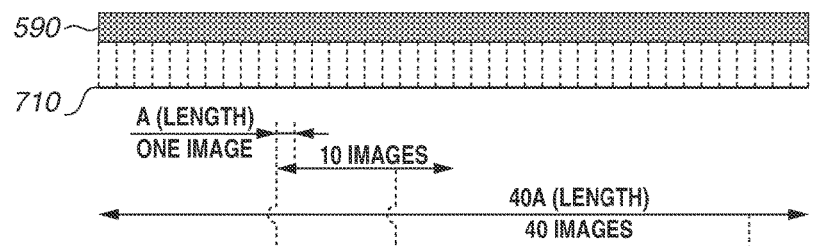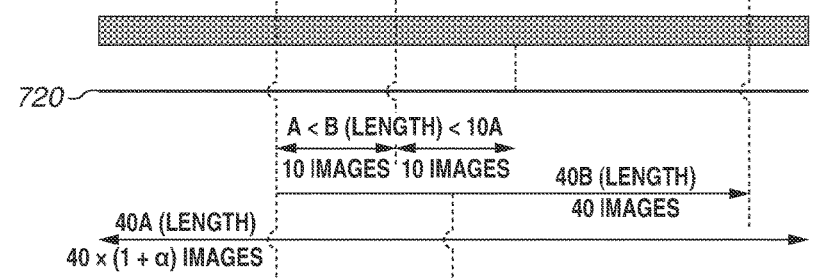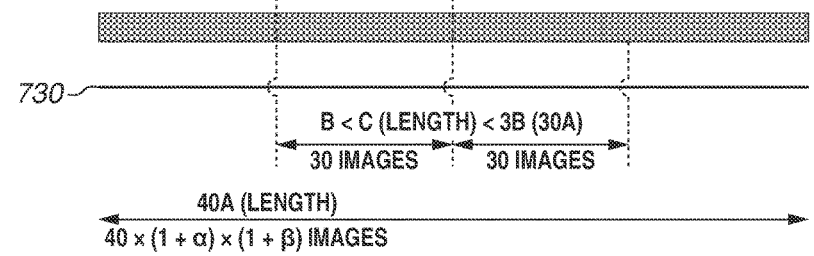

WHEN NUMBER OF IMAGES TO BE
JUMPED IS DETERMINED BY DATE
(DIVIDED BY NUMBER OF DAYS)

WHEN NUMBER OF IMAGES TO BE
JUMPED IS DETERMINED BY DATE
(DIVIDED BY TOTAL NUMBER
OF IMAGE FILES)

DISPLAY CONTROL APPARATUS, METHOD FOR CONTROLLING SAME, AND STORAGE MEDIUM

BACKGROUND

Field

The present disclosure relates to a technique for switching images to be displayed via a touch operation.

Description of the Related Art

Electronic apparatuses and smartphones that change images to be displayed via a touch operation have been widely used in recent years. Japanese Patent Application Laid-Open No. 2006-211390 discusses displaying an image corresponding to a display position of a cursor based on the position of the cursor in a position display area. Japanese Patent Application Laid-Open No. 2015-172836 discusses advancing images via a touch operation.

A user who searches for an image to be displayed can search images close in order to the currently-displayed image or can search images remote in order from the currently-displayed image. If the operation discussed in Japanese Patent Application Laid-Open No. 2006-211390 is performed via a touch operation as discussed in Japanese Patent Application Laid-Open No. 2015-172836, a touch-move needs to be made over a large distance to advance images to ones remote in order. If the distance of the touch-move is set to facilitate searching images remote in order, the distance of a touch-move in displaying images close in order becomes so small that fine adjustment is difficult to make.

SUMMARY

The present disclosure is directed to a technique for improving the operability of users in making an image switching operation via a touch operation.

According to an aspect of the present disclosure, a display control apparatus includes, a touch detection unit that detects a touch operation on a touch panel, a unit setting unit configured to set a unit of unit-by-unit image switching, and a switching unit configured to switch images to be displayed so that if the unit set by the unit setting unit is a first unit, an image the first unit ahead is displayed based on a predetermined touch-move of moving a touch position on the touch panel being made for a first distance, and if the unit set by the unit setting unit is a second unit greater than the first unit, an image the second unit ahead is displayed based on the predetermined touch-move being made for a second distance longer than the first distance, wherein the second distance is shorter than a distance of the predetermined touch-move required to display an image the second unit ahead of a first image when the unit set by the unit setting unit is the first unit.

Further features will become apparent from the following description of exemplary embodiments with reference to the attached drawings.

BRIEF DESCRIPTION OF THE DRAWINGS

FIG. 3 is a flowchart illustrating playback mode processing according to an exemplary embodiment.

FIGS. 7A, 7B, 7C, 7D, and 7E are diagrams illustrating an image advancing operation via a touch-move operation according to the exemplary embodiment.

DESCRIPTION OF THE EMBODIMENTS

An exemplary embodiment will be described below with reference to the drawings.

Figure 1A:
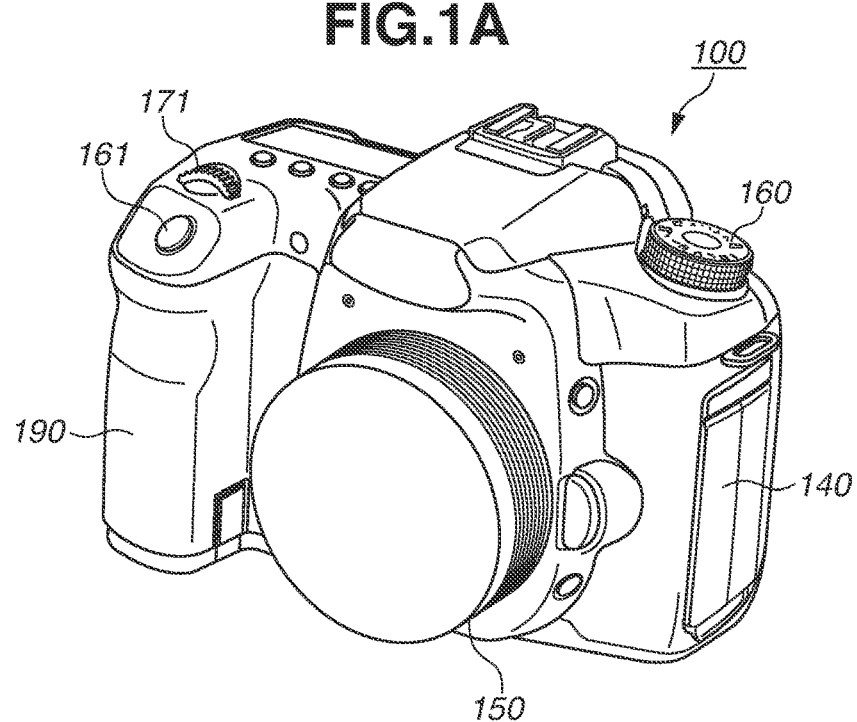
FIGS. 1A and 1B are diagrams illustrating an appearance of an imaging apparatus.
Figure 1B:
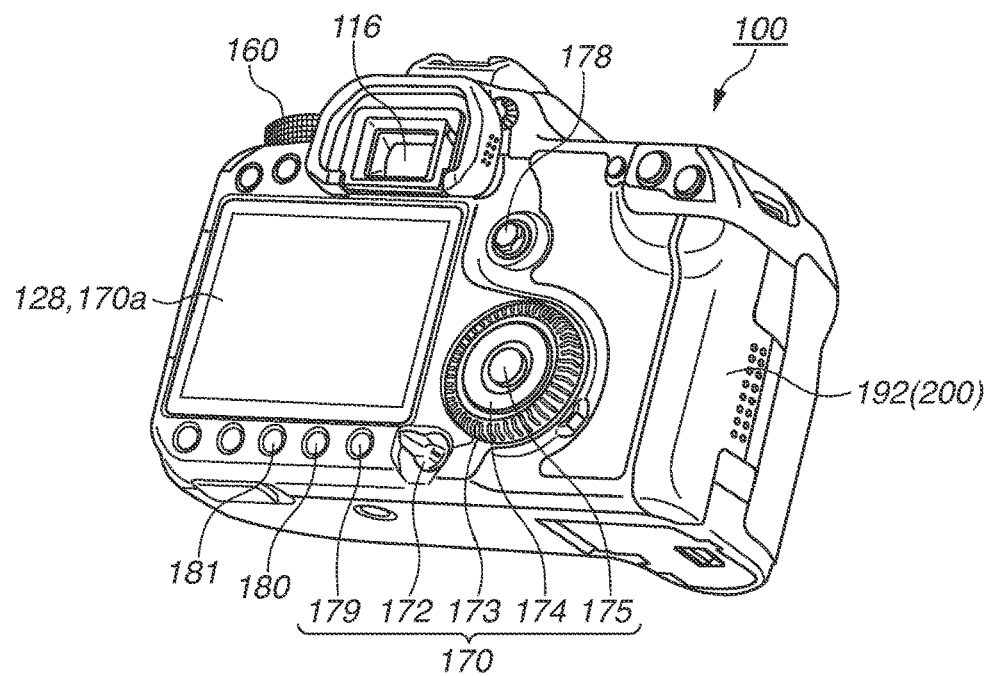

FIGS. 1A and 1B are diagrams illustrating an appearance of a digital camera according to a first exemplary embodiment of an imaging apparatus to which the present disclosure is applicable. FIG. 1A is a front perspective view of a digital camera 100. FIG. 1B is a rear perspective view of the digital camera 100. In FIGS. 1A and 1B, a display unit 128 is a display unit for displaying images and various types of information. The display unit 128 includes a touch panel 170a that detects a touch operation. A shutter button 161 is an operation unit for giving imaging instructions. A mode change switch 160 is an operation unit for switching various modes. A terminal cover 140 is a cover for covering a connection cable connector (not illustrated) for connecting a connection cable of an external apparatus to the digital camera 100. A main electronic dial 171 is a rotary operation member. Setting values such as a shutter speed and an aperture value can be changed by rotating the main electronic dial 171. A power switch 172 is an operation member for switching on and off of a power supply of the digital camera 100. A sub electronic dial 173 is a rotary operation member for moving a selection frame and advancing images. A cross key 174 is a four-way key, i.e., an upper, lower, left, and right portions of which can be each pressed. Operations of the digital camera 100 can be made based on the pressed portions of the cross key 174. A set button 175 is a push button that is mainly used to determine a selected item. A lens unit 150 includes lenses.

A live view (LV) button 178 is a button for switching on and off of an LV. In a moving image capturing mode, the LV button 178 is used to give instructions to start and stop capturing (recording) a moving image. A zoom button 180 is an operation button for turning on and off a zoom mode during a live view display in an image capturing mode, and changing a magnification ratio in the zoom mode. In a playback mode, the zoom button 180 functions as a zoom button for magnifying a playback image to increase the magnification ratio. A reduction button 181 is a button for reducing the magnification ratio of the magnified playback image to reduce the displayed image. A playback button 179 is an operation button for switching between the image capturing mode and the playback mode. If the playback button 179 is pressed in the image capturing mode, the digital camera 100 enters the playback mode, whereby a latest image among images recorded on a recording medium 200 can be displayed on the display unit 128. The shutter button 161, the main electronic dial 171, the power switch 172, the sub electronic dial 173, the cross key 174, the set button 175, the LV button 178, and the playback button 179 are included in an operation unit 170.

An eyepiece viewfinder (hereinafter, referred to as viewfinder) 116 is a look-in type viewfinder for observing a focusing screen 213, described below, to check focus and composition of an optical image of an object, obtained through the lens unit 150. A lid 192 is a lid of a slot in which the recording medium 200 is loaded. A grip portion 190 is a holding portion with a shape easy to grip by the right hand when the user holds the digital camera 100.

Figure 2:
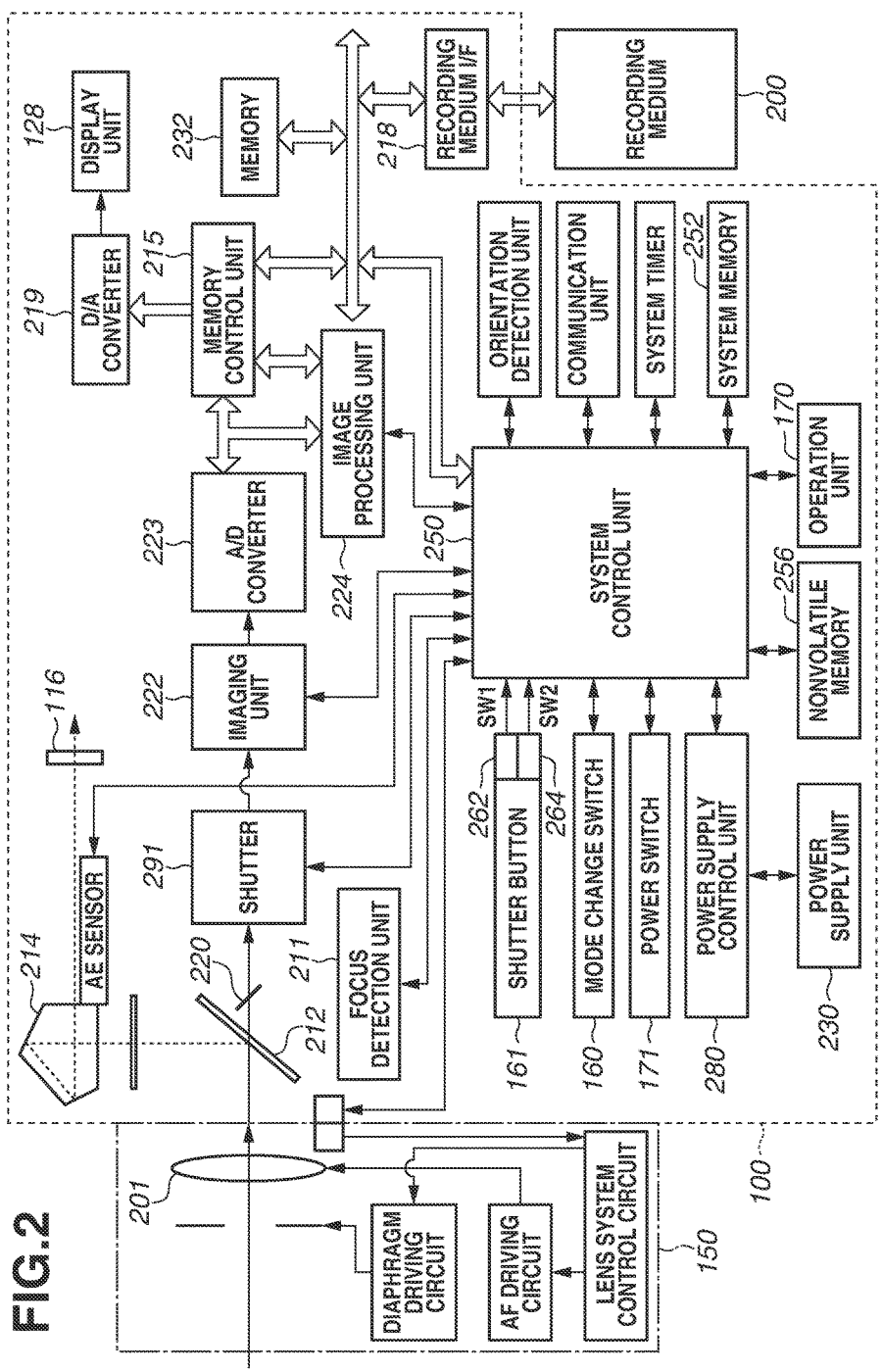
FIG. 2 is a block diagram illustrating an example of a hardware configuration of the imaging apparatus.

FIG. 2 is a block diagram illustrating a configuration example of the digital camera 100 according to the present exemplary embodiment. In FIG. 2, the lens unit 150 is an interchangeable lens unit including an imaging lens. For the sake of simplicity, a lens 201 is illustrated as a single lens, whereas a plurality of lenses is usually included.

A mirror 212 is moved up and down by an actuator (not illustrated) based on instructions from a system control unit 250 during exposure, live view imaging, and moving image capturing. The mirror 212 is a mirror for switching a light flux incident from the lens 201 toward the viewfinder 116 and an imaging unit 222. Normally, the mirror 212 is arranged to reflect and guide the light flux to the viewfinder 116. When imaging is performed or during a live view display, the mirror 212 is flipped up and retracted from the light flux (mirror up) so that the light flux is guided to an imaging unit 222. The mirror 212 is configured as a half mirror so that part of the light flux can be transmitted through a center portion thereof. The part of the light flux is reflected by a sub mirror 220 arranged subsequent thereto and is incident on a focus detection unit 211 for focus detection.

The user of the digital camera 100 observes an image formed on the focusing screen 213 via a pentaprism 214 and the viewfinder 116, and can thereby check a focus state and composition of the optical image of the object obtained through the lens unit 150. A focal plane shutter 291 controls an exposure time of the imaging unit 222 under control of the system control unit 250.

The imaging unit 222 includes an image sensor, such as a charge-coupled device (CCD) sensor or a complementary metal-oxide-semiconductor (CMOS) sensor, for converting an optical image into an electrical signal. An analog-to-digital (A/D) converter 223 converts an analog signal into a digital signal. The image sensor in the imaging unit 222 photoelectrically converts an object image formed on the image sensor through the lens unit 150 and outputs the resultant as an electrical signal.

An image processing unit 224 performs resize processing, such as predetermined pixel interpolation and reduction, and color conversion processing on data from the A/D converter 223 or data from a memory control unit 215. The image processing unit 224 also performs predetermined calculation processing by using captured image data. Based on the obtained calculation result, the system control unit 250 performs exposure control and range finding control. Through-the-lens (TTL) automatic focus (AF) processing, automatic exposure (AE) processing, and electronic flash (EF) (i.e., flash preliminary emission) processing are thereby performed. The image processing unit 224 also performs predetermined calculation processing by using the captured image data, and performs TTL automatic white balance (AWB) processing based on the obtained calculation result.

Output data from the A/D converter 223 is written to a memory 232 via the image processing unit 224 and the memory control unit 215, or directly via the memory control unit 215. The memory 232 stores image data that is obtained by the imaging unit 222 and digitally converted by the A/D converter 232, and image data to be displayed on the display unit 128. The memory 232 has a storage capacity sufficient to store a predetermined number of still images and a predetermined time period of a moving image and sound.

The memory 232 also serves as a memory for image display (video memory). A digital-to-analog (D/A) converter 219 converts data for image display, stored in the memory 232, into an analog signal and supplies the analog signal to the display unit 128. The data for image display, written in the memory 232, is thus displayed by the display unit 128 via the D/A converter 219. The display unit 128 provides display based on the analog signal from the D/A converter 219 on a display such as a liquid crystal display (LCD). If a digital signal that is once A/D converted by the A/D converter 223 and stored in the memory 232 is analog converted by the D/A converter 219 and successively transferred to and displayed on the display unit 128, the display unit 128 functions as an electronic viewfinder. This enables a through image display (live view display). The display unit 128 is a liquid crystal rear monitor for displaying an image. As illustrated in FIG. 1B, the display unit 128 is provided on the rear surface of the digital camera 100. The display unit 128 is not limited to an LCD and can be other types of displays for displaying an image. Examples thereof include an organic electroluminescence (EL) display.

A nonvolatile memory 256 is a memory that can be electrically erased and recorded by the system control unit 250. For example, an electrically erasable programmable read-only memory (EEPROM) is used as the nonvolatile memory 256. The nonvolatile memory 256 stores, for example, operation constants and a program for the system control unit 250. The program here refers to a program for performing various flowcharts described below in the present exemplary embodiment.

The system control unit 250 includes at least one built-in processor, and controls the entire digital camera 100. The system control unit 250 executes the foregoing program recorded in the nonvolatile memory 256 to implement each process of the present exemplary embodiment described below. A system memory 252 is a random access memory (RAM). Operation constants and variables for operating the system control unit 250 and the program read from the nonvolatile memory 256 are loaded into the system memory 252. The system control unit 250 also performs display control by controlling the memory 232, the D/A converter 219, and the display unit 128.

The mode change switch 160, the shutter button 161, and the operation unit 170 are operation units for inputting various operation instructions to the system control unit 250. The mode change switch 160 switches an operation mode of the system control unit 250 to a still image recording mode, a moving image capturing mode, or the playback mode. The still image recording mode includes modes such as an automatic imaging mode, an automatic scene determination mode, a manual mode, an aperture value priority mode (Av mode), and a shutter speed priority mode (Tv mode). Various scene modes, which are scene-specific imaging settings, a program AE mode, and a custom mode are also included. The mode change switch 160 is used to switch directly to any one of such modes included in a menu screen. Alternatively, the mode change switch 160 can be used to once switch to the menu screen, and other operation members can be then used to switch to any one of the modes included in the menu screen. The moving image capturing mode can similarly include a plurality of modes.

A first shutter switch 262 turns on to generate a first shutter switch signal SW1 if the shutter button 161 provided on the digital camera 100 is operated halfway, i.e., half-pressed (imaging preparation instruction). Based on the first shutter switch signal SW1, the system control unit 250 starts operations of the AF processing, the AE processing, the AWB processing, and the EF processing. A second shutter switch 264 turns on to generate a second shutter switch signal SW2 if the shutter button 161 is completely operated, i.e., fully pressed (imaging instruction). Based on the second shutter switch signal SW2, the system control unit 250 starts a series of imaging processing operations from reading of a signal from the imaging unit 222 to writing of image data to the recording medium 200.

The operation unit 170 includes various operation members serving as input units for accepting operations from the user. The operation unit 170 includes operation units such as the main electronic dial 171, the power switch 172, the sub electronic dial 173, the cross key 174, the set button 175, the LV button 178, the zoom button 180, the reduction button 181, and the playback button 179. Some of the functions of the operation unit 170 are assigned to the touch panel type display unit 128. If various function icons displayed on the display unit 128 are selected and operated, scene-specific appropriate functions are assigned to operation buttons of the operation unit 170 that are displayed on the display unit 128, and the operation buttons function as various function buttons. Examples of the function buttons include an end button, a back button, an image advancing button, a jump button, a narrow-down button, and an attribute change button. For example, if a menu button is pressed, a menu screen that enables various settings is displayed on the display unit 128. The user can make touch operations on the menu screen displayed on the display unit 128 and can intuitively make various settings.

The foregoing touch panel type operation unit 170 is configured so that the touch panel 170*a* (touch detection unit) that detects touch operations is integrally arranged on the surface of the display unit 128. For example, the touch panel 170*a* is configured to have a light transmittance not to interfere with the display of the display unit 128, and attached to an upper layer of the display surface of the display unit 128. Input coordinates of the touch panel 170*a* are then associated with display coordinates on the display unit 128. In such a manner, a graphical user interface (GUI) enabling the user to make operations as if intuitively operating the screen displayed on the display unit 128 can be configured.

The system control unit 250 can detect the following operations or states of the touch panel 170*a*:

A state where a finger or pen not having touched the touch panel 170*a* first comes touches the touch panel 170*a*. In other words, a start of a touch (hereinafter, referred to as a "touch-down").

A state where the touch panel 170*a* is being touched with a finger or pen (hereinafter, referred to as a "touch-on").

A state where a finger or pen touching the touch panel 170*a* moves (hereinafter, referred to as a "touch-move").

A state where a finger or pen touching the touch panel 170*a* is released. In other words, an end of a touch (hereinafter, referred to as a "touch-up").

A state in which nothing is touching the touch panel 170*a* (hereinafter, referred to as a "touch-off").

If a touch-down is detected, a touch-on is simultaneously detected. After the touch-down, the touch-on usually continues to be detected unless a touch-up is detected. A touch-move can be detected in a state where a touch-on is detected. Even if a touch-on is detected, a touch-move operation is not detected without a movement of the touch position. A touch-off occurs after a touch-up of all touching fingers and pens are detected to be made.

Such operations and states and position coordinates where a finger or pen touches the touch panel 170*a* are notified to the system control unit 250 through an internal bus. Based on the notified information, the system control unit 250 determines what operation is made on the touch panel 170*a*. In the case of a touch-move, the system control unit 250 can determine both vertical and horizontal components, on the touch panel 170*a*, of the moving direction of the finger or pen moving on the touch panel 170*a* based on a change in the position coordinates. If the user makes a touch-down on the touch panel 170*a*, a certain touch-move, and then a touch-up, the system control unit 250 determines that a "stroke" is drawn. An operation of quickly drawing a stroke will be referred to as a "flick". A flick is an operation of quickly moving a finger or pen touching the touch panel 170*a* for some distance and directly releasing the finger or pen. In other words, a flick is an operation of quickly sliding a finger or pen over the touch panel 170*a* as if flipping. A flick can be determined to be made if a touch-move is detected to be made over a predetermined distance or more at a predetermined speed or higher, immediately followed by a touch-up. If a touch-move is detected to be made over a predetermined distance or more and below a predetermined speed, the system control unit 250 determines that a drag is made. There are various systems of touch panels, including a resistive, capacitive, surface elastic wave, infrared, electromagnetic induction, image recognition, and optical sensor systems. The touch panel 170*a* can use any one of such systems. Some systems detect a touch if the touch panel is contacted. Some systems detect a touch if a finger or pen approaches the touch panel. Any of the systems can be employed.

Referring back to FIG. 2, a power supply control unit 280 includes a battery detection circuit, a direct-current-to-direct-current (DC-DC) converter, and a switch circuit for switching blocks to be energized. The power supply control unit 280 detects the presence or absence of a mounted battery, a battery type, and a remaining battery level. The power supply control unit 280 controls the DC-DC converter based on the detection results and instructions from the system control unit 250, and supplies required voltages to various components including the recording medium 200 for required periods.

A power supply unit 230 includes a primary battery such as an alkali battery and a lithium battery, a secondary battery such as a nickel-cadmium (NiCd) battery, nickel-metal hydride (NiMH) battery, and a lithium ion battery, and an alternating current (AC) adapter. A recording medium interface (I/F) 218 is an interface with the recording medium 200, such as a memory card and a hard disk. The recording medium 200 is a recording medium, such as a memory card, for recording captured images, and includes a semiconductor memory or a magnetic disk.

FIG. 3 is a flowchart illustrating playback mode processing of the digital camera 100 according to the present exemplary embodiment. Operation of this flowchart is started when the power switch 172 is operated to switch on the power supply and the playback button 179 is operated to switch to the playback mode. The program stored in the nonvolatile memory 256 is loaded into the system memory 252 and the system control unit 250 executes the program, whereby each process of the flowchart is implemented.

Figure 5A:
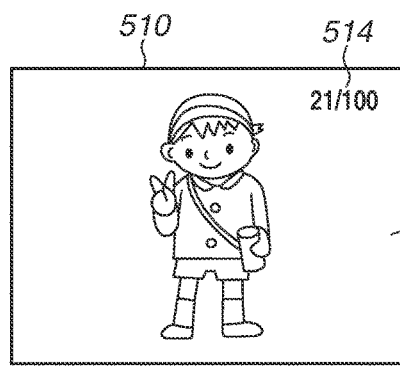
FIGS. 5A to 5H are schematic diagrams illustrating screen examples according to the exemplary embodiment.

Initially, when the playback mode processing of an image is started, in step S301, the system control unit 250 displays a "single display" image on the display unit 128. FIG. 5A illustrates a screen display example when a display state is a single display. A screen 510 displays a single image like an image 512. An index 514 indicates that 100 images are stored in the recording medium 200 and the image 512 is the 21st image of the 100 images.

In step S302, the system control unit 250 determines whether an operation for setting the number of images to be jumped in jump advancing is made. The jump advancing refers to jumping (skipping) images when the user browses the images arranged in order while advancing them. The user can set the number of images to be jumped by button operations on a menu screen in the playback mode or by operation onto the touch panel 170*a*. As described below, if the menu button is pressed on the playback screen and an item for setting the number of images to be jumped is selected, the determination of step S302 is "YES". Examples of options for the number of images to be jumped include 1, 10, 40, and by date (by unit). The user can select a desired number of images to be switched (how to separate) from such numbers of images to be jumped (unit setting). If the operation for setting the number of images to be jumped is made (YES in step S302), the processing proceeds to step S303. In step S303, the system control unit 250 sets the number of images to be jumped in jump advancing, and returns the display of the display unit 128 to the state of displaying a "single display" image. Then, the processing proceeds to step S310. If the operation for setting the number of images to be jumped is not made (NO in step S302), the processing proceeds to step S304.

In step S304, the system control unit 250 determines whether the foregoing touch-move operation of sliding the user's finger or pen is made on the touch panel 170*a*. If a touch-move operation is made (YES in step S304), the processing proceeds to step S305. If not (NO in step S304), the processing proceeds to step S306. In step S305, the system control unit 250 performs touch-move processing.

In step S306, the system control unit 250 determines whether either one of left and right keys of the cross key 174 is pressed. If the left or right key is pressed (YES in step S306), the processing proceeds to step S307. If not (NO in step S306), the processing proceeds to step S308. In step S307, the system control unit 250 performs single advancing of the playback image. If the left key is pressed in step S306, the image to be displayed advances to the previous image (i.e., image located immediately before the current image). If the right key is pressed, the image to be displayed advances to the next image (i.e., image located immediately ahead the current image).

In step S308, the system control unit 250 determines whether the sub electronic dial 173 is operated. If the sub electronic dial 173 is operated (YES in step S308), the processing proceeds to step S309. If not (NO in step S308), the processing proceeds to step S310. In step S309, the system control unit 250 performs jump advancing. If the sub electronic dial 173 is operated to rotate to the left (dial operation) in step S308, the display image advances to an image previous to the current image by the number of images to be jumped (e.g., 10 images, 30 images (N times of 1), or as many as images of the previous or subsequent days). If the sub electronic dial 173 is operated to rotate to the right, the display image advances to an image ahead of the current image by the number of images to be jumped (one unit ahead).

Figure 4B:
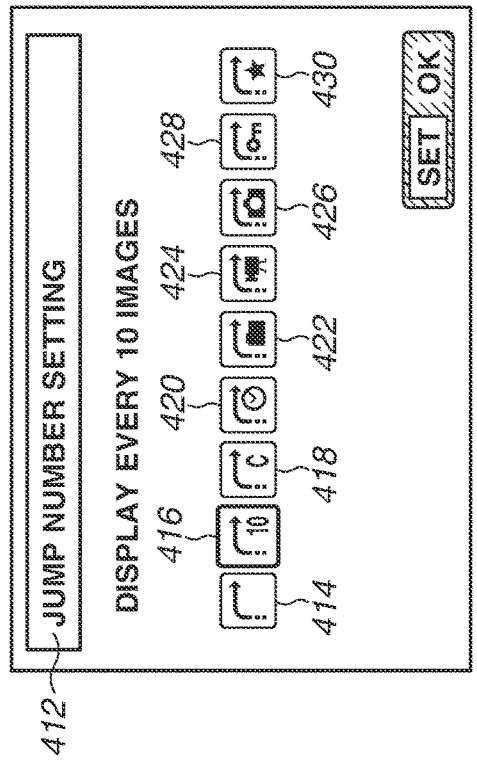
FIGS. 4A and 4B are schematic diagrams illustrating screen examples according to the exemplary embodiment.
Figure 4A:
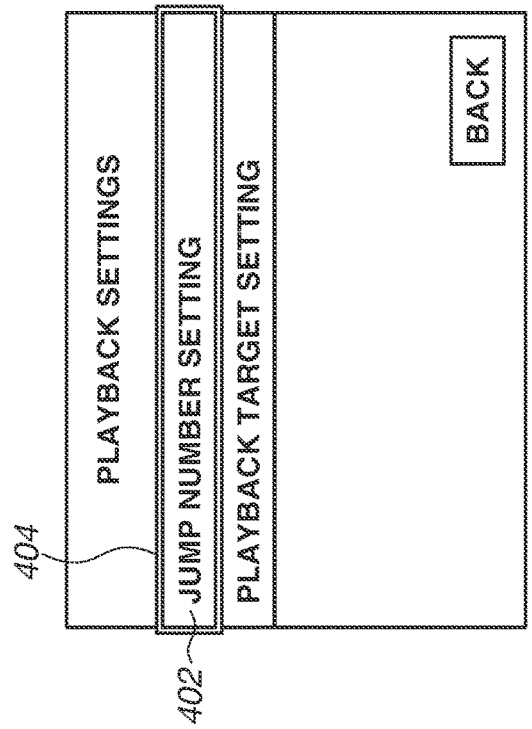

Referring to FIGS. 4A and 4B, the foregoing operation for setting the number of images to be jumped will be described. FIG. 4A illustrates a screen of the display unit 128 to be displayed when the menu button is pressed. The screen displays a list of functions 402. The user moves a cursor 404 by pressing up, down, left, or right buttons included in the operation unit 170, and presses the set button to enter a setting change screen of an arbitrary function. Alternatively, the user can select a button on the screen by operation on the touch panel 170*a*.

FIG. 4B is a diagram illustrating an example of a jump number setting screen. The jump number setting screen displays a function title 412 and options (items) 414 to 430. The function title 412 "jump number setting" is an item for setting the number of images to be jumped when the sub electronic dial 173 included in the operation unit 170 is operated. The user selects an option from the options 414 to 430. An initial value is 10 images of the option 416.

Each option will be described here. The option 414 is a setting to perform jump advancing image by image (same as normal image advancing). The option 416 is a setting to perform jump advancing in units of 10 images. The option 418 is a setting to perform jump advancing by an arbitrary number of images set by the user. Assume that the arbitrary number of images is set to 40. The option 420 is a setting to perform jump advancing in units of imaging dates. The option 422 is a setting to perform jump advancing folder by folder (group by group). The option 424 is a setting to perform jump advancing in units of moving image files. The option 426 is a setting to perform jump advancing in units of still image files. The option 428 is a setting to perform jump advancing in units of locked image files, i.e., image files on which a deletion disable flag is set. The option 430 is a setting to perform jump advancing in units of image files that are set as favorites.

Operability of an image displayed on the display unit 128 will be described with reference to FIGS. 5E to 5H. A case in which an image stored in the recording medium 200 is displayed on the display unit 128 is described here. Functions to be performed when touch operations are made on the display unit 128, and touch coordinates and touch areas for use in the following description of the exemplary embodiment, are also described. In the following description, the terms "touch-down", "touch-on", "touch-move", "touch-up", and "touch-off" are as described above.

Figure 5B:
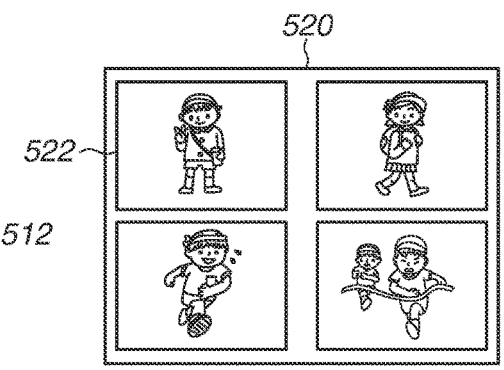
Figure 5C:
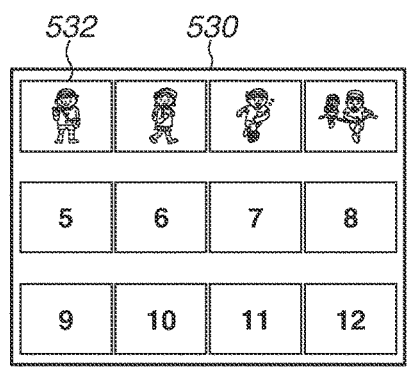
Figure 5D:
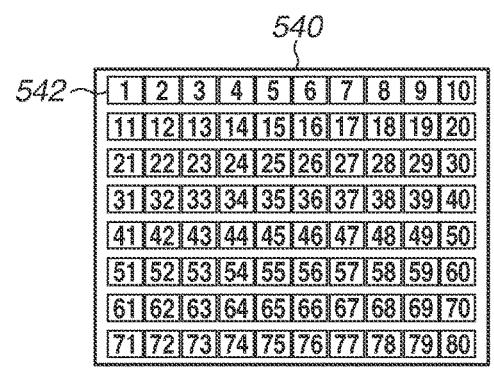
Figure 5E:
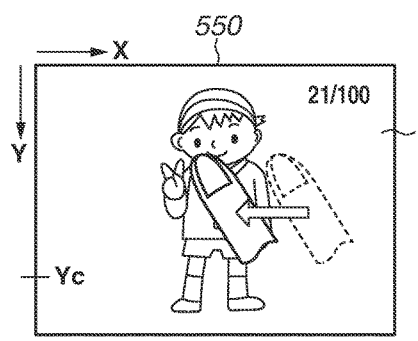

FIG. 5E illustrates a case in which a touch-down and a touch-move are made on the touch panel 170*a* of the display unit 128. The point of the touch-down will be denoted as (Xo, Yo), and a point that is currently touched-on will be denoted as (X, Y). The amount of movement in an X direction can be expressed as |X−Xo|, and the amount of movement in a Y direction as |Y−Yo|. With Yc as a border, different operability is provided when Yo≤Yc, i.e., an area above Yc is operated and when Yo Yc, i.e., an area at or below Yc is operated.

Figure 5F:
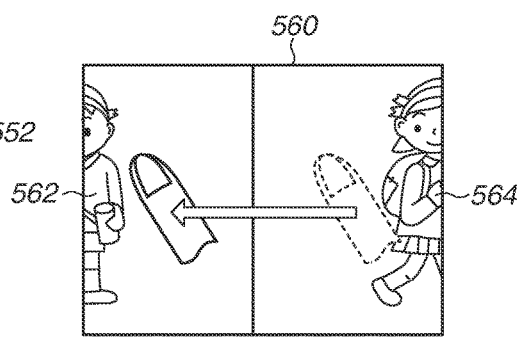

FIGS. 5E and 5F illustrate operability when an area above Yc is operated. In the present exemplary embodiment, such an operation will be referred to as "single advancing". If a touch-down and a touch-move from the right to the left are made on an image 552 on a screen 550, as illustrated in FIG. 5E, no image switching is performed until |X−Xo| exceeds a specific value (amount required to switch images by one unit). If |X−Xo| exceeds the specific value, as illustrated in FIG. 5F, image switching is performed. A screen 560 displays an image 564 on the right side of an image 562. The image 564 is the image subsequent to the image 562 stored in the recording medium 200.

Figure 5G:
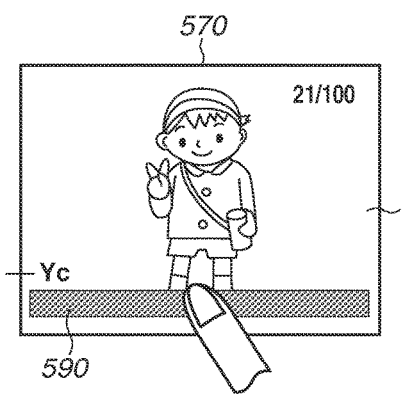
Figure 5H:
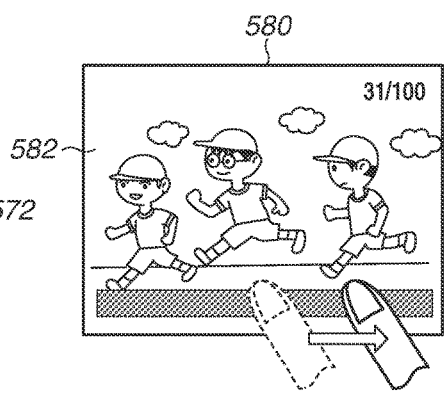

FIGS. 5G and 5H are diagrams illustrating operability when an area at or below Yc is operated. If a touch-down is made on an image 572 on a screen 570 as illustrated in FIG. 5G, a jump bar 590 is displayed. If a touch-move is made over the jump bar 590 as illustrated in FIG. 5H, jump advancing is performed to an image several images ahead based on the amount of movement M of the touch-move. The jump bar 590 is hidden upon a touch-up, and the jump advancing ends. Here, the image of ten images ahead is displayed as an image 582 since the number of images to be jumped is 10. If jump advancing can be performed for an arbitrary number of images, the number of images can be displayed as a guide for easy understanding of the user. During jump advancing, the amount of jump advancing can therefore be displayed as a guide for the user, like "X images are advanced". In the foregoing description, the playback state of the screen is described to be a single display. However, similar operability can be provided if the playback state of the screen is a multiple display.

Figure 6:
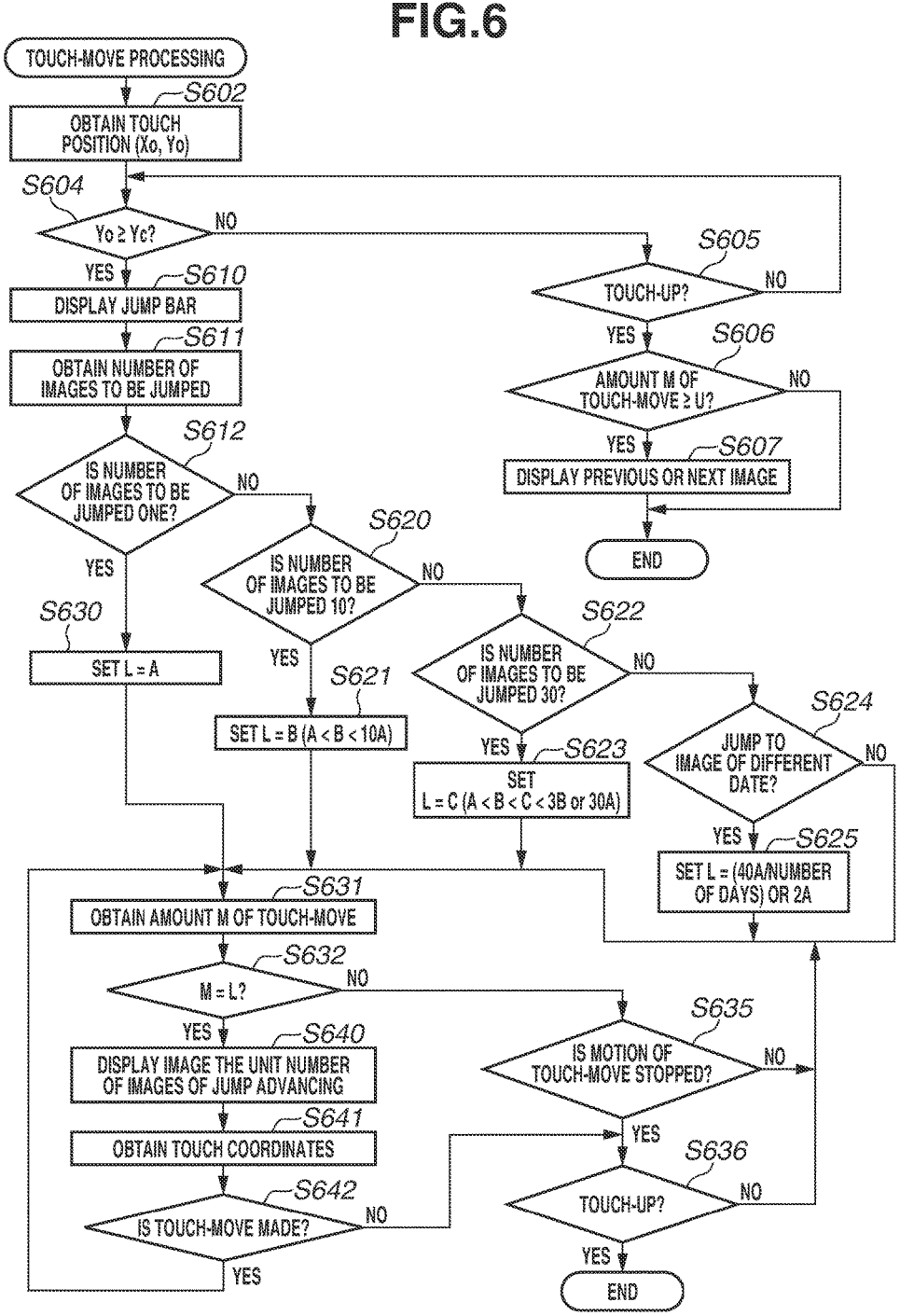
FIG. 6 is a flowchart illustrating touch-move processing according to the exemplary embodiment.

The touch-move processing, which is used in the foregoing description and is performed in step S305 of the flowchart of FIG. 3, will be described with reference to FIG. 6. FIG. 6 is a flowchart illustrating the touch-move processing of the digital camera 100 according to the present exemplary embodiment. The program stored in the nonvolatile memory 256 is loaded into the system memory 252 and the system control unit 250 executes the program, whereby each process of this flowchart is implemented.

In step S602, the system control unit 250 obtains the touch position (Xo, Yo) on the touch panel 170a of the display unit 128. In step S604, the system control unit 250 determines whether Yo Yc. If Yo Yc (inside a first area) (YES in step S604), the processing proceeds to step S610 to perform jump advancing of the playback image. If not (outside the first area) (NO in step S604), the processing proceeds to step S605 to perform single advancing of the playback image.

In step S605, the system control unit 250 determines whether a touch-up from the touch panel 170a is made. If a touch-up is made (YES in step S605), the processing proceeds to step S606. If not (NO in step S605), the processing returns to step S604. In step S606, the system control unit 250 determines whether the touch-move amount M made in the X-axis direction is greater than or equal to a predetermined threshold U. If the touch-move amount M in the X-axis direction is greater than or equal to U (YES in step S606), the processing proceeds to step S607 to perform an operation for advancing the image by one. If not (NO in step S606), the processing of FIG. 6 ends without performing image advancing. For example, the threshold U is set to a distance one half or one third of that of the touch panel 170a in the X-axis direction. In step S607, the system control unit 250 advances the image by one, i.e., displays the previous or next image of the image currently displayed on the display unit 128. Then, the flowchart ends.

In step S610, the system control unit 250 displays the jump bar 590 on the display unit 128 (see FIGS. 5G and 5H) to perform jump advancing. The horizontal width of the jump bar 590 here is set to 40 times a predetermined threshold A, i.e., 40×A. In step S611, the system control unit 250 obtains the number of images to be jumped recorded in step S303 of FIG. 3 to determine the number of images to be advanced by jump advancing (unit of image advancing). While the unit of jump advancing is described to be the number of images to be advanced, the unit of jump advancing is not limited to the number of images and can be a period-based unit such as a date, month, and time. If the unit is a period, jump advancing switches to an image that is captured (or stored) one period (e.g., one hour, one day, or one month) before or after the currently-displayed image.

In step S612, the system control unit 250 determines whether the number of images to be jumped is one. If the number of images to be jumped is one (YES in step S612), the processing proceeds to step S630. If the number of images to be jumped is not one (NO in step S612), the processing proceeds to step S620. In step S630, the system control unit 250 sets a threshold L of the touch-move amount M for advancing one image to be L=A.

In step S620, the system control unit 250 determines whether the number of images to be jumped is specified to be 10. If the number of images to be jumped is 10 (YES in step S620), the processing proceeds to step S621. If the number of images to be jumped is not 10 (NO in step S620), the processing proceeds to step S622. In step S621, the system control unit 250 sets the threshold L of the touch-move amount M for advancing 10 images to be L=B (A<B<10A), which is greater than the threshold L=A required for single advancing. Suppose, for example, that the threshold L in the case of ten image advancing is set to 2A or 3A. Since ten images (predetermined number of images) are not switched at the same pitch A as with single advancing, displayed images will not be abruptly skipped by a small amount of touch-move. Since the threshold L is made smaller than 10A, the user who wants to perform jump advancing in units of tens to easily switch to an image 30 or 40 images ahead does not need to make a touch-move from end to end of the jump bar 590. This provides excellent operability. In step S621, the system control unit 250 therefore sets the threshold L of the touch-move amount M in advancing 10 images to B (L=B) that is greater than A and smaller than 10×A (the amount of jump×the threshold in the case of single advancing). After the threshold L of the touch-move amount M for advancing images is set in step S621, the processing proceeds to step S631.

In step S622, the system control unit 250 determines whether the number of images to be jumped is specified to be 30. If the number of images to be jumped is 30 (YES in step S622), the processing proceeds to step S623. If the number of images to be jumped is not 30 (NO in step S622), the processing proceeds to step S624. In step S623, the system control unit 250 sets the threshold L of the touch-move amount M for advancing 30 images to be L=C (A<B<C<3B or 30A) that is greater than A and B. In this way, as the unit of the number of images to be jumped increases, the distance of a touch-move required to advance the unit number of images (display an image the unit number of images ahead) becomes greater than that when the unit is small. However, the switching can be made by a small distance, compared to when the same number of images are advanced in the small units. The user can thus perform jump advancing with excellent operability regardless of the unit of the number of images of the jump advancing. After the threshold L of the touch-move amount M for advancing images is set in step S623, the processing proceeds to step S631. In the foregoing example, the thresholds L for the cases of 10 images and 30 images, which are units greater than one image (units greater than a predetermined unit), are described to be L=B and L=C (B<C), respectively. However, the same threshold may be set for both cases. For example, suppose that L=2A both when the number of images to be jumped is 10 and when the number of images to be jumped is 30. In such a case, the unit number of images are switched in response to a touch-move over a distance of 2A both when the unit is 10 images and when the unit is 30 images. If the thresholds needed for switching in units greater than a predetermined unit are the same, the distance of a touch-move required to switch the unit number of images becomes constant. The user can thus make intuitive operations since the feeling of operation is unchanged regardless of the units.

In step S624, the system control unit 250 determines whether the jump of the image advancing is a jump to an image of a different imaging date. If the jump of the image advancing is one to an image of a different date (YES in step S624), the processing proceeds to step S625. If the jump of the image advancing is one to an image of the same date (NO in step S624), the processing simply proceeds to step S631. In step S625, if the number of days of all the images recorded on the recording medium 200 is 20 or less, the system control unit 250 sets the threshold L of the touch-move amount M for jumping to an image of a different date to be L=(40×A)/the number of days. With such a setting, the user can switch the images of all the dates, recorded in the recording medium 200, by a single operation of making a touch-move from end to end of the jump bar 590 that has a horizontal width of 40A. This eliminates the need to repeat touch-moves over and over to search for an intended date. Since the distance required to switch images of a single day is made as large as possible, the user can access an intended date without a precise moving operation on the touch position. If the number of days of all the images exceeds 20, the system control unit 250 sets the threshold L to be L=2A. As described above, the number of days refers to the number of days of all the images stored in the recording medium 200 (e.g., if images of three days are stored, three).

In step S631, the system control unit 250 obtains the touch-move amount M made by the user. If the touch-move amount M is detected for the first time, the touch-move amount M refers to the amount of change in the touch position in the X-axis direction between the touch position obtained in step S602 and the current touch position. From the second time or later, the touch-move amount M refers to the amount of change in the touch position in the X-axis direction between the touch position obtained in step S641 to be described below and the current touch position.

In step S632, the system control unit 250 determines whether the touch-move amount M reaches M=L (threshold set in step S630, S621, S623, or S625). If the touch-move amount M is equal to L (YES in step S632), the processing proceeds to step S640 to settle image advancing. If the touch-move amount M is smaller than L (NO in step S632), the processing proceeds to step S635. In step S635, the system control unit 250 determines whether the motion of the touch-move is stopped. If the motion of the touch-move is stopped (YES in step S635), the processing proceeds to step S636. In step S636, the system control unit 250 determines whether a touch-up is made. If a touch-up is made (YES in step S636), the operation of the flowchart ends. If the motion of the touch-move is not stopped in step S635 (NO in step S635) or if a touch-up is not made in step S636 (NO in step S636), the processing returns to step S631. The system control unit 250 then repeats the acquisition of the touch-move amount M until M=L.

If the touch-move amount M is equal to L in step S632 (YES in step S632) and the processing proceeds to step S640, the system control unit 250 advances images as many as the current unit of jump advancing, and displays the image the number of images before or after the current image on the display unit 128. At that time, a guide indicating the number of jumped images can be displayed. For example, suppose that the unit of image switching is 10 images, and a jump over 100 images is made. In such a case, the guide can be displayed in a more noticeable manner than with a jump over 30 images so that the user can recognize it if more than a predetermined number of images are advanced, compared to the unit of jump advancing.

In step S641, the system control unit 250 obtains touch coordinates (Xn, Yn) currently touched. In step S642, the system control unit 250 determines whether a touch-move is made. If a touch-move is made again after the image advancing (YES in step S642), the processing returns to step S631. In step S642, if a touch-move is not made (NO in step S642), the processing proceeds to step S636. In step S636, if a touch-up is made (YES in step S636), the operation of this flowchart ends.

Next, an image advancing operation according to the flowchart of FIG. 6 will be described with reference to FIGS. 7A to 7E.

FIG. 7A is a diagram illustrating an image switching width when the number of images to be jumped is one. The jump bar 590 is a bar for accepting the user's touch-move for jump advancing and is displayed on the display unit 128. An image switching width 710 displayed for the sake of description indicates the switching width of the number of images to be jumped. A pitch of a section obtained by equally-dividing the distance from the left end to the right end of the touch panel 170a into 40 sections will be denoted as A (same value as A in the foregoing description). A touch-move by the unit pitch A from left to right displays the next image (i.e., display number is next number of the display number of the current image). A touch-move by the unit pitch A from right to left displays the image ahead (i.e., display number is previous number of the display number of the current image). A touch-move from end to end of the touch panel 170a can advance 40 images. A touch-move of 10×A advances 10 images. For example, if A=0.2 cm, a touch-move of 2 cm advances 10 images.

FIG. 7B is diagram illustrating an image switching width when the number of images to be jumped is 10. An image switching width 720 indicates the switching width. The threshold L is set to a pitch B that is greater than the pitch A when the number of images to be jumped is one, and smaller than a touch-move distance (10×A) required to advance 10 images in the case of single advancing, indicated by the image switching width 710. A touch-move by the pitch B from left to right displays the tenth previous image (i.e., 10th image from the current image on the left side). A touch-move by the pitch B from right to left displays the tenth image ahead (i.e., 10th image from the current image on the right side). If a touch-move is made for a distance smaller than the pitch B, the display image is not switched. A touch-move from end to end of the touch panel 170a can advance more than 40 images. As described above, if the number of images to be jumped is one, a touch-move from end to end of the jump bar 590 can only advance 40 images. If the number of images to be jumped is 10, a touch-move from end to end of the jump bar 590 can advance more images. For example, if B=2A and A=0.2 cm, a touch-move of 2 cm advances 50 images.

FIG. 7C is a diagram illustrating an image switching width when the number of images to be jumped is 30. An image switching width 730 indicates the switching width. The threshold L is set to a pitch C that is greater than the pitch B when the number of images to be jumped is 10, and smaller than a touch-move distance (3×B) required to advance 30 images, indicated by the image switching width 720. A touch-move by the pitch C from left to right displays the 30th previous image (i.e., 30th image from the current image on the left side). A touch-move by the pitch C from right to left display the 30th image ahead (i.e., 30th image from the current image on the right side). A touch-move from end to end of the touch panel 170a can advance more than 30 images. The pitches B and C when the number of images to be jumped is 10 or more may be equally set, i.e., to be C=B.

Figure 7D:
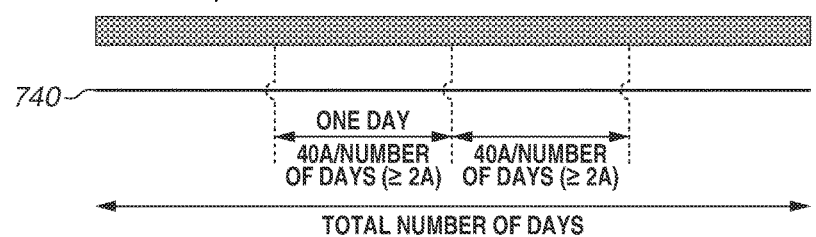

FIG. 7D is a diagram illustrating an image switching width when the number of images to be jumped is determined by date. An image switching width 740 indicates the switching width. A pitch D is determined by using the number of days of all the images stored in the recording medium 200 (if images of three days are stored, three) so that the pitch D=40×A/the number of days. A touch-move from end to end of the jump bar 590 thus enables a jump to any of the images for the total number of days. As described above, if the number of days of all the images exceeds 20, the pitch D is set to 2×A, which is greater than the pitch A of single advancing. In such a case, a touch-move from end to end of the jump bar 590 is not sufficient to switch the images over the total number of days. The pitch D is set to 2×A because if the pitch D is set to be too small, a slight operation can change images over a large number of days and an intended date is difficult to be specified as described above.

Figure 7E:
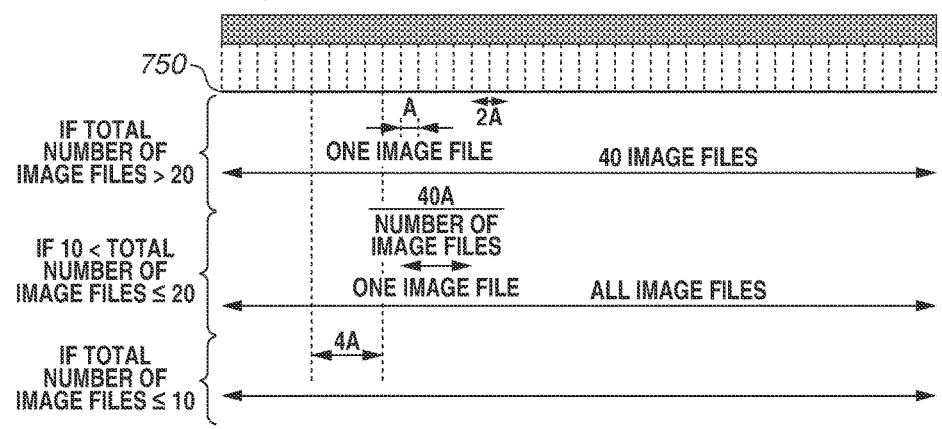

FIG. 7E is a diagram illustrating an image switching width in the case of jumping files. An image switching width 750 indicates the switching width. The pitch D is determined by dividing the horizontal width of the jump bar 590 by the total number of image files stored in the recording medium 200, i.e., D=40×A/the total number of image files. Here, the pitch D is adjusted to be at least 2×A, not to be smaller than the pitch A when the unit of jump advancing is one image. More specifically, if the total number of image files is 20 or more, the pitch D=2×A. If the total number of image files is 10 or more and less than 20, the pitch D is set to a width determined by dividing 40×A by the number of image files (>2A) so that all the files can be switched via a touch-move from end to end of the jump bar 590. If the total number of image files is less than 10, the pitch D is fixed to 4×A since the division by the number of image files results in a large touch-move distance required to switch one file.

Figure 8:
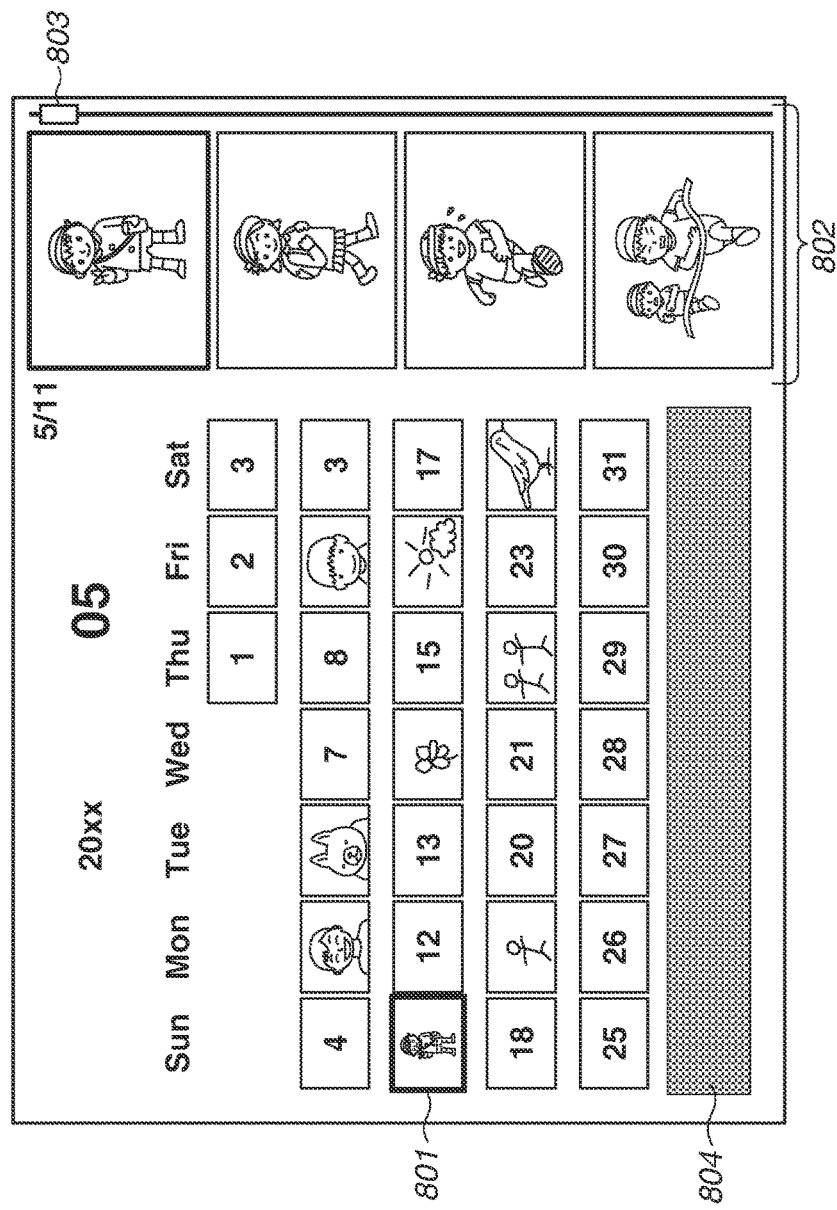
FIG. 8 is a schematic diagram illustrating a screen example according to the exemplary embodiment.

Next, an operation of jump advancing when a calendar is displayed will be described with reference to FIG. 8. FIG. 8 illustrates a state in which images are displayed on the display unit 128 in a calendar fashion. A cursor 801 indicates a selected date. For example, if May 11th is selected, images captured on the selected date are displayed in an area 802. The images in the area 802 can be scrolled by moving a cursor 803 in the area 802. The selected date can be changed by making a touch-move operation on a jump bar 804 corresponding to the jump bar 590 of FIG. 5. For example, the selected date can be moved to the previous or next date on which any image is captured, by making a touch-move operation for a distance L1. The selected date can be moved one by one, including dates without a captured image, when a touch-move is made for a predetermined distance. The distance L1 is set to be L1=40×A/the number of days if the number of days of all the images recorded on the recording medium 200 is 20 or less. If the number of days exceeds 20, the distance L1 is set to 2×A (constant value). The unit of switching is not limited to dates. If the unit of switching can be set to months or years in a setting screen, the distance L1 can be determined in the following manner. If the unit of switching is changed from dates to months or years, the distance L1 is set to 4×A that is greater than 2×A. For example, if the unit of switching is months, the length L1 is set to 4×A because 31 (days)×2×A (distance required to switch images of one day)=62×A makes it difficult to switch to images one month ahead while 2×A can cause switching of images of one year or more by only a small touch-move. The distance L1 of a touch-move required for image switching is determined regardless of the number of images included in (corresponding to) each date.

For a multiple display, 4, 12, or 80 images can be displayed on one screen. Screens can be switched in order of four images, 12 images, 80 images, and a calendar display by pressing operations on a multiple playback button included in the operation unit 170.

As described above, according to the first exemplary embodiment, the operability in performing jump advancing of images via a touch-move improves. If the lower portion of the touch panel 170a is operated, the jump bar 590 is displayed. The pitch of the jump bar 590 is changed based on a jump advancing setting, whereby the operability of jump advancing improves. As the number of images to be jumped increases, the number of images to be advanced by a jump corresponding to a certain distance or amount of touch-move can be increased. The user can thus perform rough image advancing by operating the lower portion of the touch panel 170a and then perform fine image advancing by operating the upper portion of the touch panel 170a. This enables operations as intended by the user.

The setting of the number of images to be jumped is not limited to the number of images or by date (period), and can be executed based on whether the images are moving images, still images, or favorites. In such a case, the pitch can be, for example, fixed to 2×A or 3×A.

In the first exemplary embodiment, the pitch is set based on the setting of the number of images to be jumped. The pitch can be set based on the number of images to be reproduced for a multiple playback. In such a case, the pitch is set based on the setting of the number of images to be reproduced during a multiple playback such as illustrated in FIGS. 5B to 5D. For example, suppose that one of four images reproduced as illustrated in FIG. 5B is displayed (step S301) by an operation for touching the image or an operation for selecting the image by moving a cursor. In such a case, the number of images to be jumped can be set to four. Similarly, in the case of a 12-image display in FIG. 5C, the number of images to be jumped can be set to 12. In the case of an 80-image display in FIG. 5D, the number of images to be jumped can be set to 80. If the number of images to be jumped is set based on the number of images in the immediately previous multiple playback, the system control unit 250 obtains the number of images during the multiple playback in step S611 of FIG. 6.

In the foregoing exemplary embodiment, the number of images displayed on one screen is described to be one. However, it is not limited thereto, and the exemplary embodiment is also applicable when a plurality of images is displayed on one screen. More specifically, if a plurality of images is last displayed as in FIGS. 5B to 5D when a touch-move to a predetermined area is made (YES in step S604), jump advancing can be performed. For example, in the case of the four-image display in FIG. 5B, four images are switched (the images displayed on one screen are switched to the four previous or subsequent images) by L=2×A. In the case of the 12-image display in FIG. 5C, 12 images are switched by L=D (2×A<D<(2×A×3)). Similarly, in FIG. 5D, a touch-move distance L required to switch the unit number of images (80 images) may be set to be L=E (D<E<2×A×(80/4)). If the unit is 12 images or more, the touch-move distance L required to switch the unit number of images may be fixed so that L=D. On the multiple playback screen, prior images appear in the Y-axis direction. A predetermined touch-move direction can be a touch-move in the Y-axis direction.

The unit of images to be switched does not need to be the same as the number of images in one screen. With a four-image playback screen, the unit can be changed to eight images (as many as two screens). With a 12-image playback screen, the unit can be changed to 36 images (as many as three screens).

FIG. 5B illustrates a screen display example when the display state is a multiple display. A screen 520 display four images, such as an image 522 and others. FIG. 5C illustrates a screen display example when the display state is a multiple display. A screen 530 displays 12 images, such as an image 532 and others. FIG. 5D illustrates a screen display example when the display state is a multiple display. A screen 540 displays 80 images, such as an image 542 and others. In such a manner, a multiple display can display 4, 12, or 80 images on a screen. The number of images displayed on a screen is changed to such values based on the user's operations on the touch panel 170a. Alternatively, the multiple playback button included in the operation unit 170 can be pressed to change the number of images displayed on a screen in order of 4, 12, and 80.

The first exemplary embodiment has been described based on the assumption of jumping images by operating the jump bar 590 more than once. However, there can be a need to jump and check all the images by one touch-move to an end. A second exemplary embodiment deals with an example in which all the images are jump-advanced via a touch-move from a touch-down position to an end.

In such a case, an operation for advancing images during a touch-move is similar to that of the flowchart of the touch-move processing illustrated in FIG. 6. In the present exemplary embodiment, only differences from the first exemplary embodiment will be described. In the present exemplary embodiment, the number of images to be advanced with respect to the amount of touch-move is determined in the following manner.

First, the system control unit 250 calculates the number of images img1 from the currently-displayed image to the first image and the number of images img2 to the last image. The system control unit 250 then calculates a distance d1 from the touch position to the left end and a distance d2 to the right end. The system control unit 250 also calculates the numbers of pitches d1/A and d2/A over the distances d1 and d2.

Next, the system control unit 250 calculates the number of images to be advanced per pitch (per unit amount A of touch-move), X1=img1/(d1/A), for advancing img1 images from the currently-displayed image to the first image. The system control unit 250 similarly calculates the number of images to be advanced per pitch (per unit amount A of touch-move), X2=img2/(d2/A), for advancing img2 images from the currently-displayed image to the last image. The system control unit 250 sets the value of the greater one of X1 and X2 to be X. X, if a decimal, is rounded up to an integer.

The resulting X is used as the number of images to be advanced per unit amount A of touch-move. If the number of images to be advanced per unit amount A of touch-move is set to X, all the images can be jump-advanced by an operation from the touch position to the left or to the right.

More specifically, for example, suppose that X1>X2 and X is set to be X=X1. In such a case, the number of images to be advanced by an operation from the touch position to the left is X×(d1/A)=X1×(d1/A)=img1. All the img1 images from the currently-displayed image to the first image can thus be jump-advanced. The number of images to be advanced by an operation from the touch position to the right is X×(d2/A)=X1×(d2/A)>X2×(d2/A)=img2, i.e., greater than img2. If an operation from the touch position to the right is made, all the img2 images from the currently-displayed image to the last image therefore can also be jump-advanced.

As described above, in the second exemplary embodiment, the number of images to be advanced per unit amount of touch-move is calculated based on the number of images from the currently-displayed image to the first image, the number of images to the last image, the distance from the touch position to the left end, and the distance to the right end. All the images can thus be jump-advanced by an operation from the touch position to the left or to the right. Similar to the first exemplary embodiment, operations intended by the user can be performed by switching the scale of the image advancing.

The first exemplary embodiment is described on the assumption of jumping images by operating the jump bar 590 more than once. In the second exemplary embodiment, all the images are described to be jump-advanced if a touch-move is made from the position of a touch-down to an end.

There may be a need to determine whether to jump images beyond a date in performing jump advancing if the jump advancing setting is made by date in particular. A third exemplary embodiment deals with an example in which boundary lines are drawn on the jump bar 590 during jump advancing if the jump advancing setting is made by date.

In such a case, an operation for advancing images during a touch-move is similar to that of the flowchart relating to the touch-move processing illustrated in FIG. 6. In the present exemplary embodiment, only differences from the first exemplary embodiment will be described. In the present exemplary embodiment, boundary lines are drawn on the jump bar 590 in the following manner.

First, the system control unit 250 calculates the numbers of images from the current image to images of respective dates. To calculate the numbers of images in a direction of going back dates by a leftward touch-move operation, the system control unit 250 calculates the numbers of images to the last images of the previous dates. In a direction of advancing dates by a rightward touch-move operation, the system control unit 250 calculates the numbers of images to the first images of the subsequent dates. The system control unit 250 then draws boundary lines on the jump bar 590 based on the numbers of images calculated as described above and the touch position.

As described above, in the third exemplary embodiment, if the menu setting of jump advancing is made by date, the system control unit 250, when a touch position is settled, calculates boundary positions based on the numbers of images of respective dates and draws boundary lines on the jump bar 590. This enables the user to recognize jump advancing of images beyond a date, and enables operations as intended by the user.

The foregoing various types of control described to be performed by the system control unit 250 can be performed by hardware. A plurality of hardware elements can perform the control of the entire imaging apparatus by sharing the processing.

Exemplary embodiments have been described in detail above. These specific exemplary embodiments are not seen to be limiting, and various embodiments not departing from the essence of the invention are also included in the present disclosure. Each of the foregoing exemplary embodiments merely shows an exemplary embodiment of the present disclosure, and the exemplary embodiments can be combined as appropriate.

The foregoing exemplary embodiments have been described using the digital camera 100 as an example. However, this example is not seen to be limiting, and an exemplary embodiment can be applied to a display control apparatus that switches display images via a touch operation. More specifically, an exemplary embodiment is applicable to a personal computer (PC), a mobile phone terminal, a portable image viewer, a digital photo frame, a music player, a game machine, an electronic book reader, a tablet PC, a smartphone, a projection apparatus, and a home appliance, if they include a touch panel. An exemplary embodiment is also applicable to an apparatus for controlling a display apparatus that receives a live view image captured by a digital camera via wired or wireless communication and displays the live view image for remote image display. Examples of such an apparatus includes a smartphone, a tablet PC, and a desktop PC.

Other Exemplary Embodiments

One or more functions of the foregoing exemplary embodiments can be implemented by processing of supplying a program to a system or an apparatus via a network or a storage medium, and reading and executing the program by one or more processors of a computer of the system or apparatus. The one or more functions can be implemented by a circuit (e.g., an application specific integrated circuit (ASIC)).

According to an exemplary embodiment, the operability of the user in making an image switching operation via a touch operation can be improved.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-025272, filed Feb. 14, 2017, which is hereby incorporated by reference herein in its entirety.

What is claimed is:

1. A display control apparatus comprising:
a memory and at least one processor to perform operations of the following units:
a touch detection unit that detects a touch operation on a touch panel;
a unit setting unit configured to set a unit of unit-by-unit image switching; and
a switching unit configured to switch images to be displayed so that if the unit set by the unit setting unit is a first unit, an image the first unit ahead is displayed based on a predetermined touch-move of moving a touch position on the touch panel being made for a first distance, and if the unit set by the unit setting unit is a second unit greater than the first unit, an image the second unit ahead is displayed based on the predetermined touch-move being made for a second distance longer than the first distance,
wherein the second distance is shorter than a distance of the predetermined touch-move required to display an image the second unit ahead of a first image when the unit set by the unit setting unit is the first unit.

2. The display control apparatus according to claim 1, wherein the first unit and the second unit are numbers of images, and the number of images of the second unit is N times the number of images of the first unit.

3. The display control apparatus according to claim 2, wherein a number of images to be switched based on the predetermined touch-move being made for a third distance when the second unit is set is smaller than N times the number of images to be switched based on the predetermined touch-move being made for the third distance when the first unit is set.

4. The display control apparatus according to claim 1, wherein control is performed so that a distance of the predetermined touch-move required to switch images to be displayed on the display unit as many as the unit set by the unit setting unit when the unit is the second unit is the same as that when the unit is a third unit greater than the second unit.

5. The display control apparatus according to claim 1,
wherein the first unit is one image, and
wherein the second unit either a day, a month, or a year.

6. The display control apparatus according to claim 1,
wherein the predetermined touch-move is acceptable when a single image is displayed on a screen of the display unit, and
wherein the first unit is one image.

7. The display control apparatus according to claim 1,
wherein the first unit is a date, and
wherein the second unit is a month.

8. The display control apparatus according to claim 1,
wherein the second unit is a unit of a predetermined group,
wherein if a number of groups switchable based on the predetermined touch-move is smaller than a predetermined number, the second distance changes based on the number of groups, and wherein if the number of groups is greater than the predetermined number, the second distance is a constant distance regardless of the number of groups exceeding the predetermined number.

9. The display control apparatus according to claim 8, wherein the predetermined group is a date or a folder in which images recorded on a recording medium are stored.

10. The display control apparatus according to claim 1, wherein the predetermined touch-move is acceptable when a plurality of images is displayed on a screen of the display unit, and
wherein the unit setting unit is configured to set a unit corresponding to a number of images to be displayed on the one screen as the unit of image switching.

11. The display control apparatus according to claim 1, wherein the predetermined touch-move is a touch operation for moving the touch position along a first direction after a touch is started on a first area of the touch panel, the first area being longer in the first direction.

12. The display control apparatus according to claim 11, wherein the switching unit performs control to display a bar indicating the first area.

13. The display control apparatus according to claim 11, wherein the switching unit performs control to, based on a touch being started on a second area of the touch panel and then released after a movement of the touch position along the first direction, the second area being different from the first area, switch an image displayed on an display unit to an image of adjoining order regardless of the unit set by the unit setting unit if the movement of the touch position is longer than a predetermined distance.

14. The display control apparatus according to claim 1, wherein the unit setting unit is configured to set a number of images displayed when a plurality of images is last displayed on a screen of a playback screen as the unit of image switching.

15. The display control apparatus according to claim 1, wherein the switching unit is further configured to, based on an operation on a predetermined operation member, switch images by the unit set by the unit setting unit.

16. The display control apparatus according to claim 15, wherein the operation on the predetermined operation member is a dial operation.

17. A method for controlling a display control apparatus, comprising:
detecting a touch operation on a touch panel;
setting a unit of unit-by-unit image switching; and
switching images to be displayed so that if the set unit is a first unit, an image the first unit ahead is displayed based on a predetermined touch-move of moving a touch position on the touch panel being made for a first distance, and if the set unit is a second unit greater than the first unit, an image the second unit ahead is displayed based on the predetermined touch-move being made for a second distance longer than the first distance,
wherein the second distance is shorter than a distance of the predetermined touch-move required to display an image the second unit ahead of a first image when the set unit is the first unit.

18. A non-transitory computer-readable storage medium storing a program for performing a method, the method comprising:
detecting a touch operation on a touch panel;
setting a unit of unit-by-unit image switching; and
switching images to be displayed so that if the set unit is a first unit, an image the first unit ahead is displayed based on a predetermined touch-move of moving a touch position on the touch panel being made for a first distance, and if the set unit is a second unit greater than the first unit, an image the second unit ahead is displayed based on the predetermined touch-move being made for a second distance longer than the first distance,
wherein the second distance is shorter than a distance of the predetermined touch-move required to display an image the second unit ahead of a first image when the set unit is the first unit.

* * * * *